United States Patent
Canter et al.

(10) Patent No.: US 12,094,254 B2
(45) Date of Patent: Sep. 17, 2024

(54) PRINTED VOTE RECORD SYSTEMS, RETROFIT AUTOMATIC DOCUMENT FEEDERS AND METHODS TO TRANSFER A PRINTED VOTE RECORD SHEET FROM A LEGACY PRINTER TO A LEGACY SCANNER WITHOUT HUMAN INTERVENTION

(71) Applicant: Hart InterCivic, Inc., Austin, TX (US)

(72) Inventors: James M. Canter, Austin, TX (US); Viktor Partyshev, Round Rock, TX (US)

(73) Assignee: Hart InterCivic, Inc., Austin, TX (US)

( * ) Notice: Subject to any disclaimer, the term of this patent is extended or adjusted under 35 U.S.C. 154(b) by 441 days.

(21) Appl. No.: 17/555,811

(22) Filed: Dec. 20, 2021

(65) Prior Publication Data

US 2023/0196861 A1 Jun. 22, 2023

(51) Int. Cl.
*G07C 13/00* (2006.01)
*H04N 1/00* (2006.01)
*H04N 1/12* (2006.01)

(52) U.S. Cl.
CPC ......... *G07C 13/00* (2013.01); *H04N 1/00588* (2013.01); *H04N 1/00602* (2013.01); *H04N 1/00631* (2013.01); *H04N 1/00649* (2013.01); *H04N 1/1215* (2013.01)

(58) Field of Classification Search
CPC ........... H04N 1/00588; H04N 1/00602; H04N 1/00631; H04N 1/00649; H04N 1/1215; G07C 13/00; G07C 13/005; G07C 13/02
See application file for complete search history.

(56) References Cited

U.S. PATENT DOCUMENTS

| | | |
|---|---|---|
| 7,881,652 B2 | 2/2011 | Edwards et al. |
| 8,444,135 B2 | 5/2013 | Morita et al. |
| 9,944,097 B1* | 4/2018 | Younis ..................... B65H 5/06 |
| 10,620,885 B2 | 4/2020 | Iwata |
| 2006/0280534 A1 | 12/2006 | Cook et al. |

OTHER PUBLICATIONS

Canon, Image Formula DR-G2140, "High Speed, High-Quality Scanning for Outstanding Production Efficiency", 2019, 2 pgs.

* cited by examiner

*Primary Examiner* — Jeremy R Severson
(74) *Attorney, Agent, or Firm* — Egan, Enders & Huston LLP.

(57) ABSTRACT

Embodiments of systems and methods are disclosed herein to transfer a printed election sheet from a printer to a scanner, which is separate and distinct from the printer, without human intervention. More specifically, the present disclosure provides a retrofit automatic document feeder (ADF), which may be "retrofit" or adaptively coupled between a printer and a scanner for automatically transferring a printed election sheet output from the printer to the scanner, where it is scanned to generate a scanned image of the printed election sheet. Unlike conventional ADFs incorporated within printers, scanners and multi-function printers, the retrofit ADF disclosed herein is coupled to receive a printed election sheet output from an output port of the printer, advance the printed election sheet away from the output port of printer and automatically transfer the printed election sheet to an input port of the scanner.

32 Claims, 9 Drawing Sheets

PRINTED VOTE RECORD SYSTEMS, RETROFIT AUTOMATIC DOCUMENT FEEDERS AND METHODS TO TRANSFER A PRINTED VOTE RECORD SHEET FROM A LEGACY PRINTER TO A LEGACY SCANNER WITHOUT HUMAN INTERVENTION

BACKGROUND OF THE INVENTION

The present disclosure relates to automatic document feeders (ADFs) used for printed vote records. More specifically, the present disclosure is directed to a retrofit ADF for automatically transferring printed vote record sheets from a legacy printer to a legacy scanner, which is separate and distinct from the legacy printer, without human intervention.

A variety of electronic voting systems are well known. One example of an electronic voting system is a direct recording electronic (DRE) voting system. As known in the art DRE voting systems electronically record votes to directly create an electronic cast vote record. An "electronic cast vote record" is an electronic record that indicates the voter's choice, or voting selections, in a manner determined in accordance with the voting system. Thus, an electronic cast vote record is an electronic record of a voter's cast vote selections and may be used in the vote tabulation process.

In contrast to DRE voting systems, other electronic voting systems may use a ballot marking device (BMD) to receive a voter's electronic vote selections, a printer to generate a full faced printed marked ballot containing the voter's electronic vote selections, and a scanner to scan the printed marked ballot for creation of the electronic cast vote record and electronic tabulation. In some election work flows, the printer output may also be a printed vote record (PVR). The use of printed marked ballots and printed vote records in an electronic voting allows the creation of a paper trail of voter selections that may be used, for example, by an elections office for audit purposes. Electronic voting systems that generate and scan printed marked ballots and printed vote records are also known as "hybrid voting systems," since they fall between all electronic DRE voting and purely paper-based hand-marked ballots.

One particular type of BMD is utilized for accessible voting and is referred to as a Disabled Access Unit™ (DAU). A DAU uses accessibility features to receive electronic vote selections from voters that have difficulty hand-marking paper ballots and/or entering electronic vote selections into traditional BMDs that do not include accessibility features. The voter's electronic vote selections received by a DAU ballot marking device may be supplied to a printer to generate a machine marked ballot containing the voter's electronic vote selections. The machine marked ballot may then be entered into a scanner to capture the vote selections of the voter. The output of the printer may also be used as a PVR in some election system workflows. The machine marked ballot or PVR may be provided to the scanner for scanning and creation of an electronic cast vote record. For many voters requiring the use of a DAU, conventional election system workflows utilizing DAUs often disadvantageously require the interaction of an election poll worker to assist in transporting the printer output to the scanner due to physical limitations of the voter.

Some ballot marking devices may utilize a printer to generate a printed election sheet. As used herein, a "printed election sheet" refers to a printed election sheet that is utilized in an election voting workflow. Examples of printed election sheets include but are not limited to printed ballots (marked or unmarked), printed vote records, or any other printed election sheet that is utilized to indicate the voting selections of a voter in an election. A digital scanner may then be used to scan the printed election sheet and create an electronic cast vote record. In some cases, the printed election sheet may be printed on full sized sheets of paper (e.g., standard 8.5×11 inch or 8.25×14 inch paper stock). However, the printed election sheet may also be printed on customized or specialized sheet sizes. In some cases, for example, the length (and/or width) of the printed election sheet may be dependent on the number of contests in the election. As such, the length (and/or width) of the printed election sheet may vary from one election to the next and from one precinct to another.

Once a printed election sheet is generated for a voter, it is often hand-delivered by the voter or a voter assistant (for example, an election official or poll worker) to the digital scanner for creation of the electronic cast vote record. In other words, transferring the printed election sheet from the printer to the digital scanner is a manual process that requires human intervention. This is time consuming, provides an opportunity for human error and/or tampering, and may present challenges to some voters. Further, for voter's using a DAU, this human intervention process often requires the assistance of an election official or poll worker to transport the printed election sheet from the printer to the scanner.

Automatic document feeders (ADFs) are known and widely used in a variety of legacy printers, scanners and multi-function printers that combine printing, scanning, faxing, etc., in one machine. As used herein, a "legacy" printer, scanner or multi-function printer is a commercial off-the-shelf machine. In legacy printers, scanners and multi-function printers, ADFs incorporated within the machine are used to automatically feed blank or printed election sheets of paper from an internal hopper, or an external input tray, into the machine. Once printed, scanned, faxed, etc., the sheets of paper are output from the machine and deposited into an output tray for collection. Although provided as a feature within legacy printers, scanners and multi-function printers, ADFs have not been used to automatically transfer sheets of paper between two distinct machines, such as a legacy printer and a legacy scanner, which is separate and distinct from the legacy printer.

It would be desirable to adapt a legacy printer to a legacy scanner, so that printed election sheets output from the legacy printer can be automatically fed into the legacy scanner without human intervention. This would be beneficial in a wide variety of applications including, but not limited to, voting systems.

SUMMARY OF THE INVENTION

The present disclosure provides improved systems and methods to transfer a printed election sheet from a printer to a scanner, which is separate and distinct from the printer, without human intervention. More specifically, the present disclosure provides a retrofit automatic document feeder (ADF), which may be "retrofit" or adaptively coupled between a printer and a scanner for automatically transferring a printed election sheet output from the printer to the scanner, where it is scanned to generate a scanned image of the printed election sheet. Unlike conventional ADFs incorporated within printers, scanners and multi-function printers, the retrofit ADF disclosed herein is coupled to receive a printed election sheet output from an output port of the printer, advance the printed election sheet away from the output port of printer and automatically transfer the printed election sheet to an input port of the separate scanner. In one embodiment the system of the present disclosure is advantageous for use with printed election sheets that may have varying sizes depending upon a particular election configuration.

In some embodiments, the retrofit ADF disclosed herein may be installed within an output tray of the printer, and may generally include an input path aligned with the output port of printer, an open end that allows the printed election sheet to advance away from the output port of the printer without restricting a maximum length of the printed election sheet, and an output path aligned with the input port of the scanner. By providing the retrofit ADF with an open end, the retrofit ADF described herein may be used to automatically transfer printed election sheets having a wide variety of lengths between the printer and the scanner.

In some embodiments, a length of the output path of the retrofit ADF may be adjustable to accommodate a horizontal distance between the output port of the printer and the input port of the scanner. In some embodiments, an angle of the output path of the retrofit ADF may also be adjustable to accommodate a vertical distance between the output port of the printer and the input port of the scanner. In doing so, the retrofit ADF described herein may be adapted to retrofit a wide variety of printers and scanners.

According to one embodiment, an election voting system is provided herein comprising a retrofit automatic document feeder (ADF) coupled between a printer and a scanner, which is separate and distinct from the printer, and a processing device configured to control the retrofit ADF. The printer may be configured to output a printed election sheet from the printer. The retrofit ADF may be coupled to receive the printed election sheet output from the printer, advance the printed election sheet away from an output port of printer and automatically transfer the printed election sheet to an input port of the scanner, where it may be scanned to generate a scanned image of the printed election sheet. Further, a processing device may be configured to control the retrofit ADF.

According to another embodiment, a retrofit automatic document feeder (ADF) for use in an election voting workflow utilizing a printed election sheet is provided, the ADF being coupled between a legacy printer and a legacy scanner, which is separate and distinct from the legacy printer. The retrofit ADF described herein may generally include an input path, an output path and a roller sub-assembly. The input path of the retrofit ADF may be aligned with an output port of the legacy printer and coupled to receive a printed election sheet output from the output port of the legacy printer. The output path of the retrofit ADF may be aligned with an input port of the legacy scanner. The roller sub-assembly may be coupled to the input path of the retrofit ADF and the output path of the retrofit ADF, and may be configured to advance the printed election sheet away from the output port of the legacy printer and automatically transfer the printed election sheet to the input port of the legacy scanner.

According to yet another embodiment, a method is provided herein to transfer a printed election sheet from a printer to a scanner without human intervention. The method described herein may generally include providing a retrofit automatic document feeder (ADF) between the printer and the scanner, wherein the scanner is separate and distinct from the printer; receiving a printed election sheet output from an output port of the printer within an input path of the retrofit ADF; advancing the printed election sheet away from the output port of the printer; and automatically transferring the printed election sheet to an input port of the scanner. In the method disclosed herein, said advancing the printed election sheet and said automatically transferring the printed election sheet may be performed by the retrofit ADF in response to command signals received from a processing device controlling the retrofit ADF.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the disclosed concept and are therefore not to be considered limiting of its scope, for the disclosed concept may admit to other equally effective embodiments.

DESCRIPTION OF THE PREFERRED EMBODIMENTS

The present disclosure provides improved systems and methods to transfer a printed election sheet from a printer to a scanner, which is separate and distinct from the printer, without human intervention. More specifically, the present disclosure provides a retrofit automatic document feeder (ADF), which may be "retrofit" or adaptively coupled between a printer and a scanner for automatically transferring a printed election sheet output from the printer to the scanner, where it is scanned to generate a scanned image of the printed election sheet. Unlike conventional ADFs incorporated within printers, scanners and multi-function printers, the retrofit ADF disclosed herein is coupled to receive a printed election sheet output from an output port of the printer, advance the printed election sheet away from the output port of printer and automatically transfer the printed election sheet to an input port of the scanner. In one embodiment the system of the present disclosure is advantageous for use with printed election sheets that may have varying sizes depending upon a particular election configuration.

In some embodiments, the retrofit ADF disclosed herein may be installed within an output tray of the printer, and may generally include an input path aligned with the output port of printer for receiving a printed election sheet, an open end that allows the printed election sheet to advance away from the output port of the printer without restricting a maximum length of the printed election sheet, and an output path aligned with the input port of the legacy scanner. By providing the retrofit ADF with an open end, the retrofit ADF disclosed herein may be used to automatically transfer printed election sheets having a wide variety of lengths between the printer and the scanner.

In some embodiments, the length of the output path of the retrofit ADF may be adjustable to accommodate a horizontal distance between the output port of the printer and the input port of the scanner. In some embodiments, an angle of the output path of the retrofit ADF may also be adjustable to accommodate a vertical distance between the output port of the printer and the input port of the scanner. In doing so, the retrofit ADF disclosed herein may be adapted to retrofit a wide variety of printers and scanners, each of which may comprise different physical dimensions.

Figure 1:
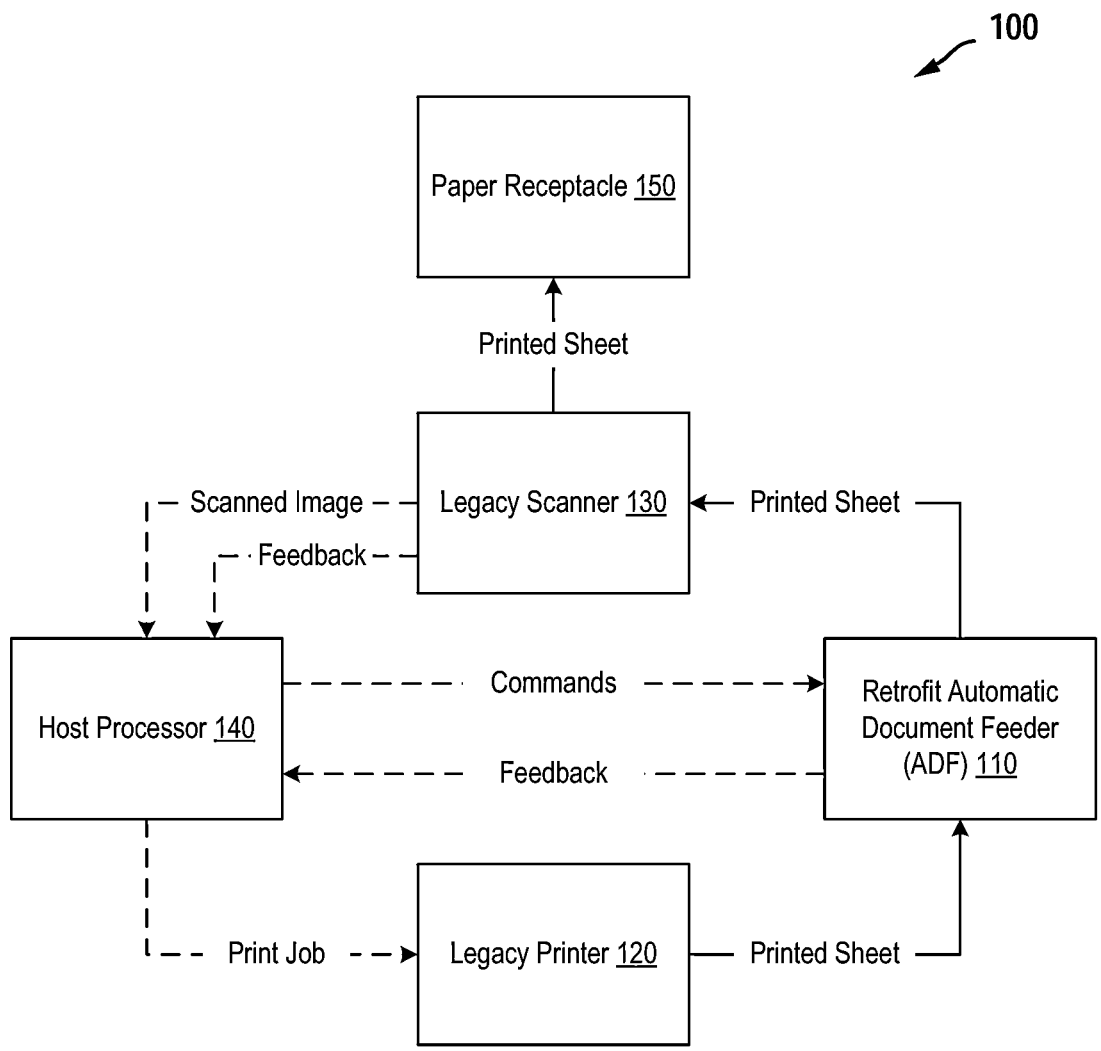
FIG. 1 is a block diagram of a system in accordance with one embodiment of the present disclosure, the system comprising a retrofit automatic document feeder (ADF) provided between a legacy printer and a legacy scanner, and a host computer coupled for controlling the retrofit ADF.

FIG. 1 is a block diagram of a system 100 in accordance with one embodiment of the present disclosure. As shown in FIG. 1, the system 100 includes a retrofit automatic document feeder (ADF) 110 provided between a legacy printer 120 and a legacy scanner 130, which is separate and distinct from the legacy printer 120, and a host processor 140, which is communicatively coupled for controlling the retrofit ADF 110, the legacy printer 120 and/or the legacy scanner 130.

The host processor 140 shown in FIG. 1 may include various types of programmable integrated circuits (e.g., a processor such as a controller, microcontroller, microprocessor, application specific integrated circuit "ASIC," etc.) and programmable logic devices (such as a field programmable gate array "FPGA", complex programmable logic device "CPLD," etc.). In some embodiments, host processor 140 may be included within a host computer, which is coupled to the retrofit ADF 110, the legacy printer 120 and the legacy scanner 130 by a wired or wireless communication interface. In other embodiments, host processor 140 may be coupled for controlling one or more of the retrofit ADF 110, the legacy printer 120 and the legacy scanner 130, and a separate processor or processing device (not shown) may be included within the system 100 for controlling the components not controlled by the host processor 140. For example, an internal processing device (e.g., a microprocessor, microcontroller, ASIC, FPGA, etc.) may be included within the retrofit ADF 110 for controlling various operations thereof. Thus, a processing device may be provided internal or external to the ADF for controlling various operations of the system, including the ADF operations.

The legacy printer 120 is configured to output a printed election sheet from an output port of the legacy printer 120. In some embodiments, the legacy printer 120 may output a printed election sheet in response to a print job, which is supplied from the host processor 140 to the legacy printer 120, as shown in FIG. 1. In one example implementation, the print job supplied from the host processor 140 to the legacy printer 120 may include electronic voting selections, which are input by a user or voter into an electronic voting system device (for example, a ballot marking device) which contains the host processor 140 or is communicatively coupled to the host processor 140. In other embodiments, the legacy printer 120 may output a printed election sheet without receiving a print job from a separate host processor 140. For example, the legacy printer 120 itself may be incorporated within an electronic voting system device (for example, a ballot marking device) which is configured to receive electronic voting selections input by a voter. Thus, though shown in the figures as separate devices, the host processor 140 and printer 120 may be incorporated into one integrated device, such as but not limited to, a ballot marking device.

The retrofit ADF 110 is coupled to receive a printed election sheet output from the legacy printer 120, advance the printed election sheet away from an output port of the legacy printer 120 and automatically transfer the printed election sheet to an input port of the legacy scanner 130, where it is scanned to generate a scanned image of the printed election sheet. As described in more detail below, the retrofit ADF 110 advances the printed election sheet away from the output port of legacy printer 120 and automatically transfers the printed election sheet to an input port of the legacy scanner 130 in response to command signals ("Commands") and feedback signals ("Feedback"). In some embodiments, the command signals may be supplied from the host processor 140 to the retrofit ADF 110 and the feedback signals may be received by the host processor 140 from the retrofit ADF 110, as shown in FIG. 1. In other embodiments, the command and feedback signals may be supplied by an internal processing device included within the retrofit ADF 110. After the printed election sheet is scanned by the legacy scanner 130, the scanned image may, in some embodiments, be provided to the host processor 140 and the printed election sheet may be deposited into a paper receptacle 150, as shown for example in FIG. 1.

In some embodiments, the legacy printer 120 may be a printer used to generate a printed election sheet (for example a machine marked printed ballot or a PVR) of a voter's voting selections in an election, and the legacy scanner 130 may be a digital scanner used to scan the printed election sheet to create an electronic cast vote record, provide a verification to a voter of the contents of the printed election sheet, or both. As noted above, the length (and/or width) of a printed election sheet may be dependent on the number of contests in a particular election, and thus, may vary widely from one election to the next. As described in more detail below, the retrofit ADF 110 disclosed herein may be uniquely configured to accommodate printed election sheets having a wide variety of lengths.

The legacy printer 120 and the legacy scanner 130 shown in FIG. 1 are not limited to printers and digital scanners used in electronic voting systems and may include a wide variety of commercial off-the-shelf printers and digital scanners, which may be used to print and scan a wide variety of documents. As described in more detail below, the retrofit ADF 110 may be configured to accommodate a wide variety of legacy printers 120 and legacy scanners 130. Further, though of particular use with legacy printers and scanners, it will be recognized that the concepts disclosed herein are not limited to legacy printers and scanners, and may be utilized with a wide variety of printers and scanners, which are not formed as an integral unit but instead, are separate stand-alone devices.

In some embodiments, the legacy printer 120 may include an output tray (see, e.g., FIGS. 2A and 2B), and the retrofit ADF 110 may be provided within and/or coupled to the output tray of the legacy printer 120 for receiving a printed election sheet output from the output port of the legacy printer 120. The legacy printer 120 may output the printed election sheet in simplex (single-sided) or duplex (double-sided) form. As described in more detail below, the retrofit ADF 110 and the host processor 140 may accommodate both simplex and duplex printing by supplying appropriate command signals ("Commands") from the host processor 140 to the retrofit ADF 110 in response to feedback signals ("Feedback") received by the host processor 140 from the retrofit ADF 110. In some embodiments, feedback signals may also be supplied from the legacy scanner 130 to the host processor 140, as shown in FIG. 1. Alternatively, the command signals used to control the operation of the retrofit ADF 110 may be supplied by an internal processing device included within the retrofit ADF 110 in response to feedback signals generated within retrofit ADF 110.

The techniques described herein are particularly advantages for election system workflows that utilize a Disabled Access Unit™ (DAU) as a ballot marking device (BMD) to provide accessible voting. In such workflows, the printed election sheet generated by the voter requiring the accessible voting of the DAU does not need to be physically transported by the voter (or election official or poll worker) between the printer and the scanner. Rather, the printed election sheet may be fed automatically to the scanner. In this manner, when accessible voting is carried out using the DAU, the intervention of an election official or poll worker is not needed to complete the transportation of the printed election sheet to the scanner when a voter is physically unable to transport the printed election sheet themselves. Thus, the techniques described make the election voting workflow more efficient and seamless for the voter requiring accessible voting, such as when using DAUs.

Figure 2A:
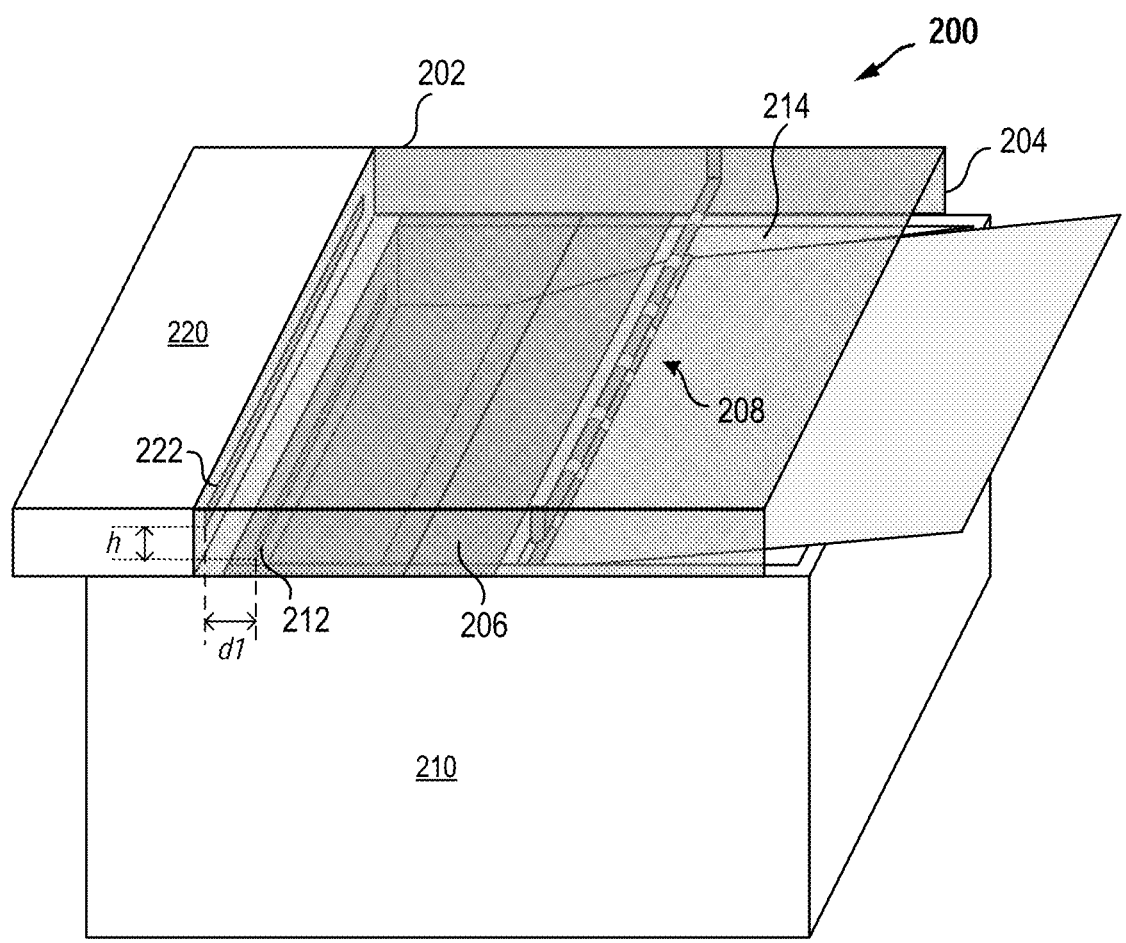
FIG. 2A is a 3D perspective view of a retrofit ADF coupled between a legacy printer and a legacy scanner mounted above the legacy printer.

FIG. 2A illustrates one embodiment of a retrofit ADF 200 in accordance with the present disclosure. The retrofit ADF 200 shown in FIG. 2A is adaptively coupled between a legacy printer 210 and a legacy scanner 220, which is a separate stand-alone device distinct from the legacy printer 210. In the particular embodiment shown in FIG. 2A, the legacy scanner 220 is mounted above the legacy printer 210, so that an input port 222 of the legacy scanner 220 is positioned near an output port 212 of the legacy printer 210.

As shown in FIG. 2A, for example, the input port 222 of the legacy scanner 220 is separated from the output port 212 of the legacy printer 210 by a vertical distance, or height (h), and a horizontal distance (d1). The vertical distance (h) and the horizontal distance (d1) may be dependent on: (a) the particular manner in which the legacy scanner 220 is mounted above, or otherwise coupled to, the legacy printer 210, and/or (b) the physical dimensions of the legacy printer 210 and the legacy scanner 220. However, the mounting configuration shown in FIG. 2A is provided as an example mounting configuration that reduces or minimizes both the vertical distance (h) and the horizontal distance (d1) between the input port 222 of the legacy scanner 220 and the output port 212 of the legacy printer 210.

The retrofit ADF 200 shown in FIG. 2A is provided within and/or coupled to an output tray 214 of the legacy printer 210 for receiving printed election sheets output from the output port 212 of the legacy printer 210. As shown more clearly in FIGS. 3A-3C, the retrofit ADF 200 may generally include an input path and an output path arranged at a first end 202 of the retrofit ADF 200, and an open end 204 opposing the first end 202 of the retrofit ADF 200. The input path of the retrofit ADF 200 is aligned with the output port 212 of the legacy printer 210 and coupled to receive the printed election sheets output from the output port 212. The output path of the retrofit ADF 200 is arranged above the input path of the retrofit ADF 200 and aligned with the input port 222 of the legacy scanner 220 for transferring the printed election sheets to the input port 222. As described in more detail below, the open end 204 of the retrofit ADF 200 allows printed election sheets of variable length to advance away from the output port 212 of the legacy printer 210 without restricting a maximum length of the printed election sheets.

The retrofit ADF 200 shown in FIG. 2A further includes a one-way flapper 206 and a roller sub-assembly 208. When a printed election sheet is printed by the legacy printer 210, the roller sub-assembly 208 receives the printed election sheet output from the output port 212 of the legacy printer 210, advances the printed election sheet away from the legacy printer 210 and automatically transfers the printed election sheet to the input port 222 of the legacy scanner 220. As described in more detail below, the roller sub-assembly 208 advances the printed election sheet away from the legacy printer 210 and automatically transfers the printed election sheet to the input port 222 of the legacy scanner 220 in response to command signals, which may be received from a host processor (e.g., host processor 140 of FIG. 1) communicatively coupled to the retrofit ADF 200 or an internal processing device (not shown) included within the retrofit ADF 110. The roller sub-assembly 208 and the command signals supplied for controlling the roller sub-assembly 208 are described in more detail below in reference to FIGS. 3A-3C and FIGS. 4A-4F.

The one-way flapper 206 is coupled between the input path and the output path of the retrofit ADF 200 to ensure that the printed election sheets output from the legacy printer 210 flow in the desired direction. For example, the one-way flapper 206 may be configured to open the input path and close the output path of the retrofit ADF 200 when a head end of a printed election sheet output from the output port 212 of the legacy printer 210 pushes through the one-way flapper 206. In addition, the one-way flapper 206 may be configured to close the input path and open the output path of the retrofit ADF 200 when a tail end of the printed election sheet advances through and past the one-way flapper 206. In other words, the opening/closing of the one-way flapper 206 is controlled by the movement of the printed election sheet through the one-way flapper 206 and gravity.

The retrofit ADF 200 shown in FIG. 2A is configured for both simplex (single-sided) or duplex (double-sided) printing. In simplex printing, a single-sided printed election sheet is output from the output port 212 of the legacy printer 210, the one-way flapper 206 opens when the head end of the single-sided printed election sheet pushes through the one-way flapper 206 and the roller sub-assembly 208 rotates in a first direction (e.g., a clockwise direction) to advance the single-sided printed election sheet in the direction of the open end 204. The one-way flapper 206 remains in the open position until the tail end of the single-sided printed election sheet advances through and past the one-way flapper 206. Once the tail end of the single-sided printed election sheet passes through the one-way flapper 206, gravitational forces cause the one-way flapper 206 to close, and the roller sub-assembly 208 rotates in an opposite direction (e.g., a counter-clockwise direction) to transfer the tail end of the single-sided printed election sheet to the input port 222 of the legacy printer 220.

In duplex printing, a single-sided printed election sheet is output from the output port 212 of the legacy printer 210, the one-way flapper 206 opens when the head end of the single-sided printed election sheet pushes through the one-way flapper 206, and closes when the single-sided printed election sheet is retracted back into the legacy printer 210 for the second side print. Once the second side is printed, the double-sided printed election sheet output from the legacy printer 210 pushes through the one-way flapper 206 again and the roller sub-assembly 208 rotates in a first direction (e.g., a clockwise direction) to advance the double-sided printed election sheet in the direction of the open end 204. The one-way flapper 206 remains in the open position until the tail end of the single-sided printed election sheet advances through and past the one-way flapper 206. Once the tail end of the single-sided printed election sheet passes through the one-way flapper 206, gravitational forces cause the one-way flapper 206 to close, and the roller sub-assembly 208 rotates in an opposite direction (e.g., a counter-clockwise direction) to transfer the tail end of the single-sided printed election sheet to the input port 222 of the legacy printer 220.

Figure 2B:
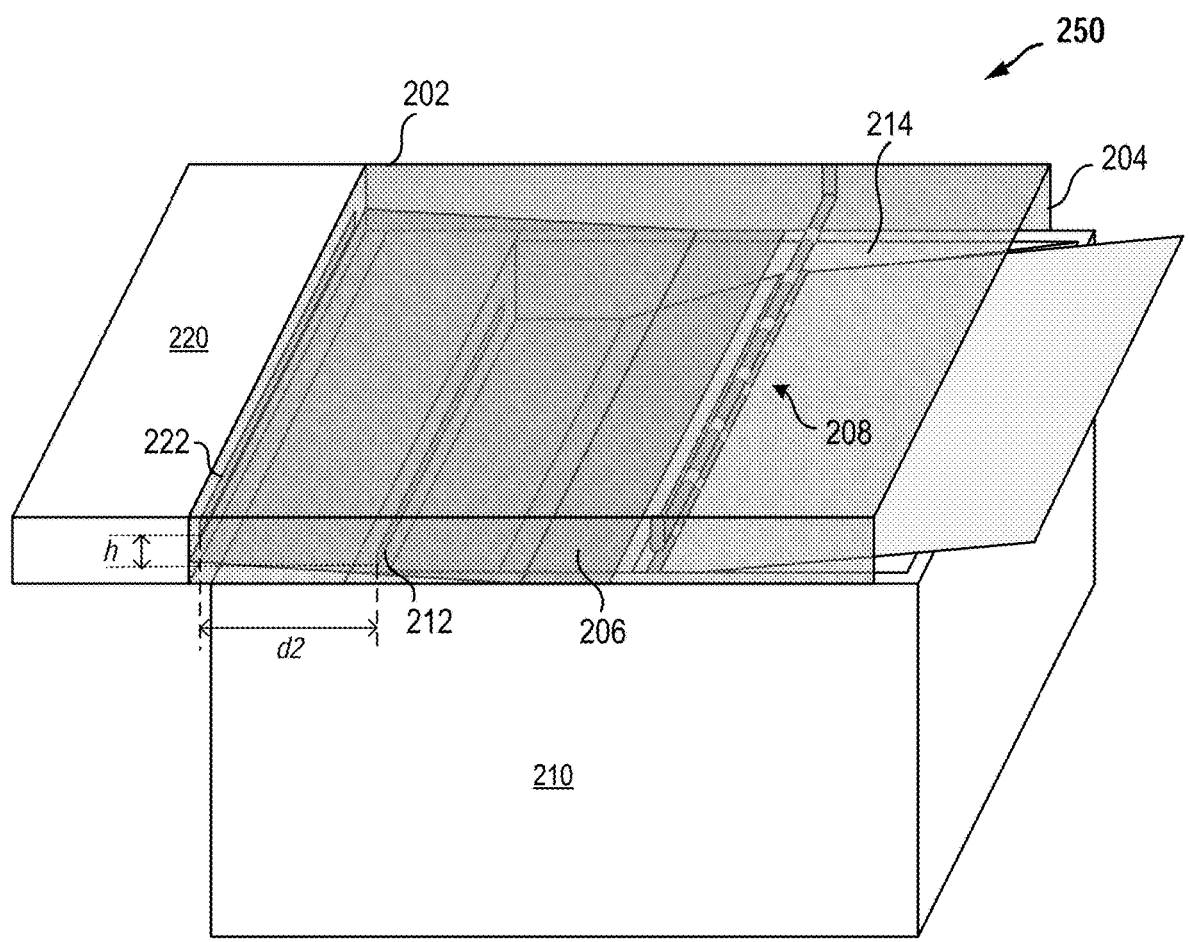
FIG. 2B is a 3D perspective view of a retrofit ADF coupled between a legacy printer and a legacy scanner mounted above and alongside the legacy printer.

FIG. 2B illustrates another embodiment of a retrofit ADF 250 in accordance with the present disclosure. Like the previous embodiment shown in FIG. 2A, the retrofit ADF 250 is adaptively coupled between the legacy printer 210 and the legacy scanner 220, which is a separate stand-alone device distinct from the legacy printer 210. The retrofit ADF 250 also includes an input path aligned with the output port 212 of the legacy printer 210 for receiving a printed election sheet, an open end 204 that allows the printed election sheet to advance away from the output port 212 of the legacy printer 210 without restricting a maximum length of the printed election sheet, and an output path arranged above the input path and aligned with the input port 222 of the legacy scanner 220 for transferring the printed election sheets to the input port 222. The retrofit ADF 250 also includes a one-way flapper 206 and a roller sub-assembly 208, as described above.

Unlike the previous embodiment shown in FIG. 2A, the retrofit ADF 250 shown in FIG. 2B is mounted above and to the side of the legacy printer 210, such that a greater horizontal distance (d2) exists between the output port 212 of the legacy printer 210 and the input port 222 of the legacy scanner 220, as compared to the retrofit ADF 200 shown in FIG. 2A. As shown in FIG. 2B, for example, the input port 222 of the legacy scanner 220 is separated from the output port 212 of the legacy printer 210 by a vertical distance (h) and a horizontal distance (d2), which is greater than the horizontal distance (d1) shown in FIG. 2A. Although the vertical distance (h) is relatively the same in FIGS. 2A and 2B, the mounting configuration and/or the physical dimensions of the legacy printer 210 and the legacy scanner 220 may cause the vertical distance (h) to be greater than or less than what is shown in the drawings.

Certain components of the retrofit ADF 200 and the retrofit ADF 250 may be adjustable in order to accommodate various mounting configurations of the legacy printer 210 and the legacy scanner 220 and/or different legacy printers 210 and legacy scanners 220 having potentially different physical dimensions. For example, and as shown more clearly in FIGS. 3B-3C below, a length of the output path of the retrofit ADF 250 may be adjustable to accommodate a horizontal distance (e.g., d1 or d2) between the output port 212 of the legacy printer 210 and the input port 222 of the legacy scanner 220. In some embodiments, an angle (α) of the output path of the retrofit ADF 250 may also be adjustable to accommodate a vertical distance (h) between the output port 212 of the legacy printer 210 and the input port 222 of the legacy scanner 220.

Figure 3A:
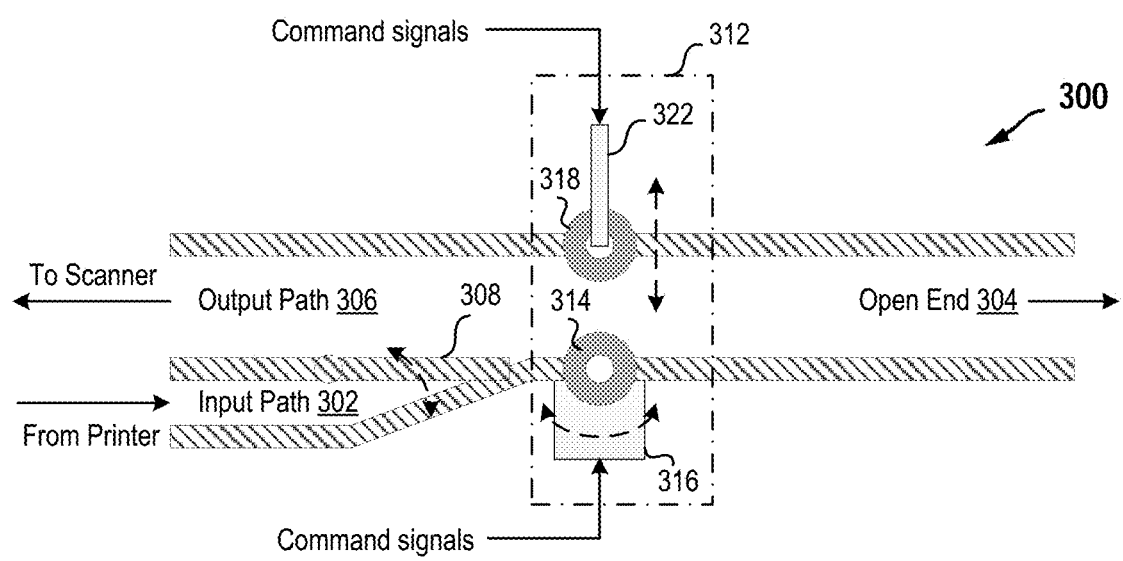
FIG. 3A is a simplified, cross-section view through a retrofit ADF in accordance with one embodiment of the present disclosure.
Figure 3B:
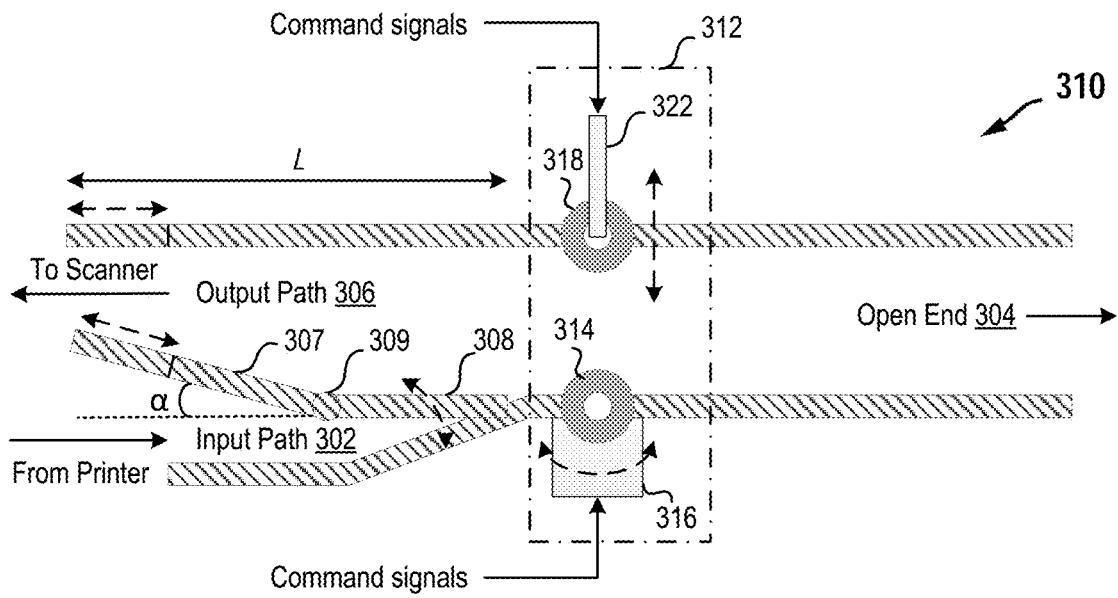
FIG. 3B is a simplified, cross-section view through a retrofit ADF in accordance with another embodiment of the present disclosure.
Figure 3C:
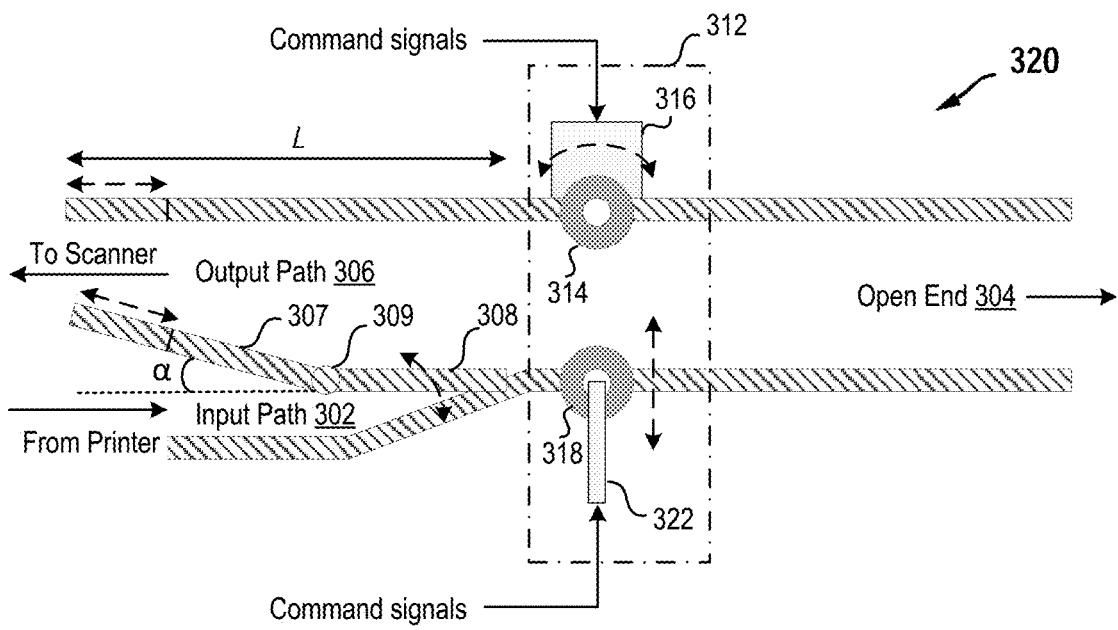
FIG. 3C is a simplified, cross-section view through a retrofit ADF in accordance with yet another embodiment of the present disclosure.

FIGS. 3A-3C are simplified, cross-section views illustrating various embodiments 300, 310 and 320 of a retrofit ADF in accordance with the present disclosure. Each embodiment 300, 310 and 320 of the retrofit ADF includes an input path 302 and an output path 304 arranged at one end of the retrofit ADF, and an open end 304 arranged at an opposite end of the retrofit ADF. As noted above, the input path 302 of the retrofit ADF is aligned with the output port of the legacy printer for receiving printed election sheets output from the legacy printer. The output path 306 of the retrofit ADF is arranged above the input path 302 of the retrofit ADF and aligned with the input port of the legacy scanner for transferring printed election sheets to the legacy scanner. The open end 304 of the retrofit ADF allows printed election sheets of variable length to advance away from the legacy printer without restricting a maximum length of the printed election sheets. This is shown even more clearly in FIGS. 4B-4D and described in more detail below.

The embodiments 300, 310 and 320 of the retrofit ADF further include a one-way flapper 308 and a roller sub-assembly 312. As noted above, the one-way flapper 308 is configured to: (a) open the input path 302 and close the output path 306 when a head end of a printed election sheet output from the legacy printer pushes through the one-way flapper 308, and (b) close the input path 302 and open the output path 306 when a tail end of the printed election sheet advances through and past the one-way flapper 308. This is shown even more clearly in FIGS. 4A-4C and described in more detail below.

As shown in FIGS. 3A-3C, the roller sub-assembly 312 includes a bi-directional sheet roller 314 driven by a rotational mechanism 316 and a pressure roller 318 driven by a vertical translation mechanism 322. The operation of the bi-directional sheet roller 314 and the pressure roller 318 is controlled by command signals, which may be supplied from an external processing device (e.g., host processor 140 of FIG. 1) or an internal processing device (included, e.g., within the retrofit ADF) to the rotational mechanism 316 and the vertical translation mechanism 322.

In some embodiments, the command signals may be supplied from the external processing device (in one example a host processor) (or internal processing device) to the rotational mechanism 316 and the vertical translation mechanism 322 in response to feedback signals, which may be received by the host processor (or the internal processing device) from the rotational mechanism 316, the vertical translation mechanism 322 and/or other sensors that may be included within the retrofit ADF. For example, the rotational mechanism 316 and/or the vertical translation mechanism 322 may provide failure notifications (e.g., notifications of motor failures) and/or travel related feedback signals to the host processor (or internal processing device). In addition or alternatively, feedback signals may be provided by one or more sensors, which may be included within the retrofit ADF to detect when a printed election sheet is released from the output port of the legacy printer, advanced past the one-way flapper 308 and/or provided to an input port of the legacy scanner.

In one example implementation, one or more paper sensors (not shown) may be included within the retrofit ADF to detect when the printed election sheet is released from the output port of the legacy printer and/or to detect travel of the printed election sheet along the input path 302 and/or the output path 304 of the retrofit ADF. For example, a first paper sensor may be mounted within the input path 302 below the output port of the legacy printer to detect when the printed election sheet is released from the output port of the legacy printer, and a second paper sensor may be mounted within the output path 304 below the input port of the legacy scanner to detect when the printed election sheet is provided to the input port of the legacy scanner. Once a printed election sheet is released from the output port of the legacy printer, the first paper sensor and/or the second paper sensor may provide feedback signal(s) to the external processor device (or internal processing device) to monitor travel of the printed election sheet along the input path 302 and/or the output path 304 of the retrofit ADF.

In another example implementation, a flapper sensor (such as, e.g., a reed switch or another open/closed detection switch) may be coupled to the one-way flapper 308 to detect when the one-way flapper 308 is open and/or closed. When the printed election sheet advances past the one-way flapper 308, the flapper sensor (not shown) may detect the closing of the one-way flapper 308 and provide a feedback signal to the external processing device (or internal processing device) to indicate that the printed election sheet is clear of the one-way flapper 308.

In yet another example implementation, the retrofit ADF may include a first paper sensor may be mounted within the input path 302, a flapper sensor coupled to the one-way flapper 308 and a second paper sensor may be mounted within the output path 304 of the retrofit ADF. The feedback signals supplied by the first paper sensor, the flapper sensor and the second paper sensor may be used by the external processing device (or internal processing device) to generate the command signals used to control the bi-directional sheet roller 314 and the pressure roller 318. In some embodiments, the feedback signals supplied by the first paper sensor, the flapper sensor and the second paper sensor may also be used by the external processing device (or internal processing device) to detect a paper jam within the retrofit ADF.

The bi-directional sheet roller 314 is configured to: (a) rotate in a first direction (e.g., a clockwise direction, as shown in FIGS. 4B-4C) to advance the printed election sheet away from the legacy printer and past the one-way flapper 308, and (b) rotate in a second direction (e.g., a counter-clockwise direction, as shown in FIGS. 4D-4F) to transfer the printed election sheet to the legacy scanner. As noted above, the operation of the bi-directional sheet roller 314 is controlled by command signals supplied from an external processing device (or internal processing device) to the rotational mechanism 316. In some embodiments, the external processing device (or internal processing device) may supply: (a) a first command signal to the rotational mechanism 316, which causes the bi-directional sheet roller 314 to rotate in the first direction to advance the printed election sheet away from the output port of the legacy printer and past the one-way flapper 308, and (b) a second command to the rotational mechanism 316, which causes the bi-directional sheet roller 314 to rotate in the second direction to transfer the printed election sheet to the input port of the legacy scanner once the printed election sheet output from the legacy printer advances through and past the one-way flapper 308.

The pressure roller 318 is configured to provide pressure to sandwich the printed election sheet between the pressure roller 318 and the bi-directional sheet roller 314 while the bi-directional sheet roller 314 advances the printed election sheet away from the output port of the legacy printer and transfers the printed election sheet to the input port of the legacy scanner. Like the bi-directional sheet roller 314, the operation of the pressure roller 318 may be controlled by command signals, which are supplied from an external processing device (or internal processing device) to the vertical translation mechanism 322. In some embodiments, the external processing device (or internal processing device) may supply: (a) a first command signal to the vertical translation mechanism 322, which causes the pressure roller 318 to move toward the bi-directional sheet roller 314 to provide the pressure needed to sandwich the printed election sheet between the pressure roller 318 and the bi-directional sheet roller 314, and (b) a second command signal to the vertical translation mechanism 322, which causes the pressure roller 318 to move away from the bi-directional sheet roller 314 to release the pressure once the printed election sheet is transferred to the input port of the legacy scanner.

The embodiments 310 and 320 shown in FIGS. 3B and 3C differ from the embodiment 300 shown in FIG. 3A by including an adjustable output path 306. As shown in FIGS. 2A, 2B, 3B and 3C, for example, the length (L) of the output path 306 may be adjusted to accommodate a horizontal distance (e.g., d1, d2) between the output port 212 of the legacy printer 210 and the input port 222 of the legacy scanner 220. In addition or alternatively, an angle (α) of the output path 306 may be adjusted to accommodate a vertical distance (h) between the output port 212 of the legacy printer 210 and the input port 222 of the legacy scanner 220. By adjusting the length (L) and/or angle (α) of the output path 306, the retrofit ADF shown in FIGS. 3B and 3C may be adapted to accommodate various mounting configurations of the legacy printer 210 and the legacy scanner 220 and/or different legacy printers 210 and legacy scanners 220 having potentially different physical dimensions.

In some embodiments, the length (L) and/or the angle (α) of the output path 306 may be adjusted through a fixed range of values. For example, the length (L) of the output path 306 may be measured from the edge of the one-way flapper 308 to the end of the output path 306, as shown in FIGS. 3B and 3C. In the embodiments 310 and 320, the length (L) of the output path 306 may be adjusted by extending portions of the output path 306 from a default position to an extended position. The length (L) of the output path 306 may be adjusted by any suitable amount to accommodate various mounting configurations of the legacy printer 210 and the legacy scanner 220 and/or different legacy printers 210 and legacy scanners 220 having potentially different physical dimensions.

The angle (α) of the output path 306 may be measured between a lower portion 307 of the output path 306 and a horizontal plane, as shown in FIGS. 3B and 3C. In the embodiments 310 and 320, the angle (α) of the output path 306 may be adjusted by rotating the lower portion 307 of the output path 306 about a hinge 309 connecting the lower portion 307 of the output path 306 to the one-way flapper 308. Like the length (L), the angle (α) of the output path 306 may be adjusted by any suitable amount to accommodate various mounting configurations of the legacy printer 210 and the legacy scanner 220 and/or different legacy printers 210 and legacy scanners 220 having potentially different physical dimensions.

In the embodiments 300 and 310 shown in FIGS. 3A and 3B, the pressure roller 318 is arranged above the bi-directional sheet roller 314. In embodiments 300 and 310, the pressure roller 318: (a) drops down toward the bi-directional sheet roller 314 to provide the pressure needed to sandwich the printed election sheet between the pressure roller 318 and the bi-directional sheet roller 314, and (b) lifts up away from the bi-directional sheet roller 314 to release the pressure once the printed election sheet is transferred to the input port of the legacy scanner.

In the embodiment 320 shown in FIG. 3C, however, the presser roller 318 is arranged below the bi-directional sheet roller 314. In embodiment 320, the pressure roller 318: (a) lifts up toward the bi-directional sheet roller 314 to provide the pressure needed to sandwich the printed election sheet between the pressure roller 318 and the bi-directional sheet roller 314, and (b) drops down away from the bi-directional sheet roller 314 to release the pressure once the printed election sheet is transferred to the input port of the legacy scanner. As such, the pressure roller 318 shown in FIG. 3C lifts the printed election sheet up when advancing the printed election sheet away from the legacy printer and transferring the printed election sheet to the input port of the legacy scanner. Lifting the printed election sheet may further assist in aligning the printed election sheet with the input port of the legacy scanner when the input port of the legacy scanner is spaced from the output port of the legacy printer by a relatively large vertical distance (h).

Figure 4A:
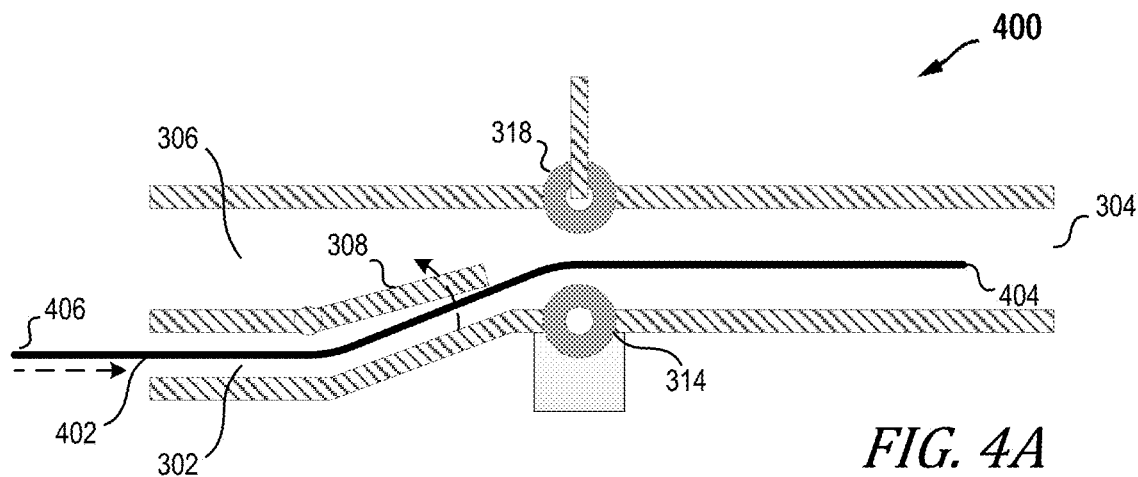
FIGS. 4A-4F are simplified, cross-section views through the retrofit ADF shown in FIG. 3A illustrating one embodiment of a process flow for automatically transferring a printed election sheet output from a legacy printer to a legacy scanner, which is separate and distinct from the legacy printer, without human intervention.
Figure 4B:
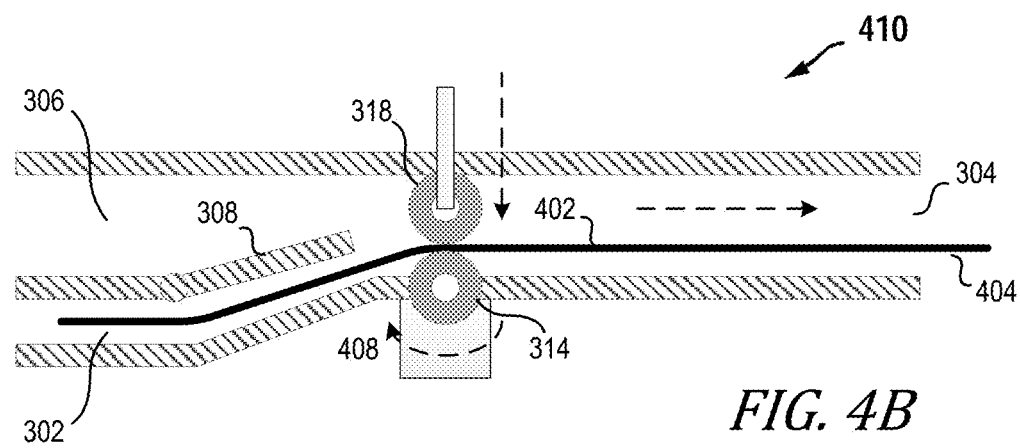
Figure 4C:
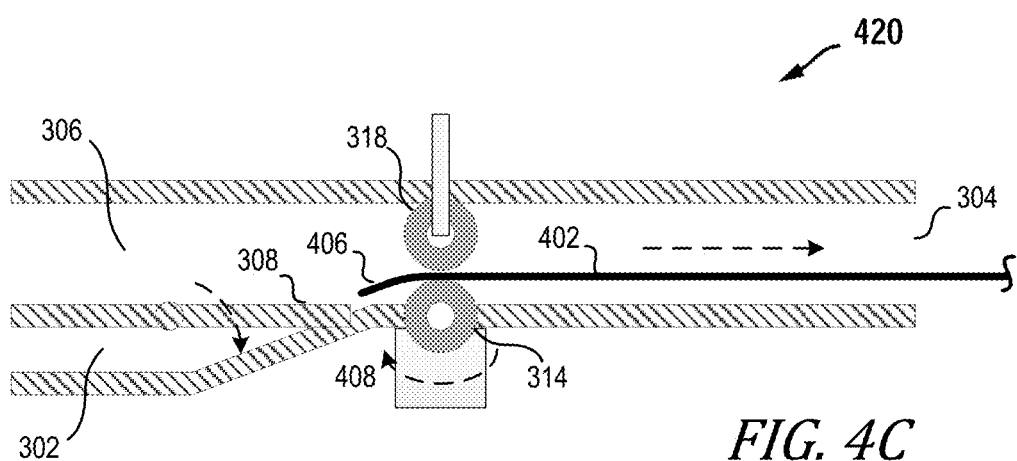
Figure 4D:
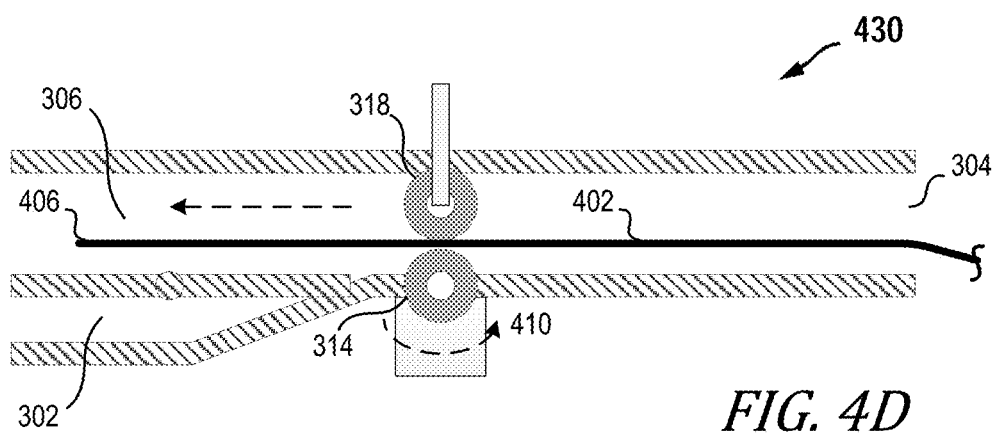
Figure 4E:
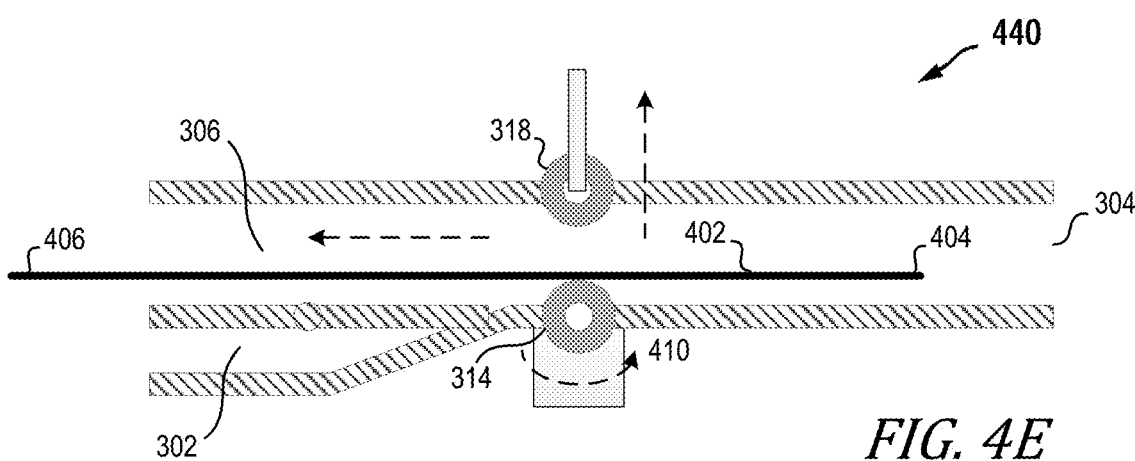
Figure 4F:
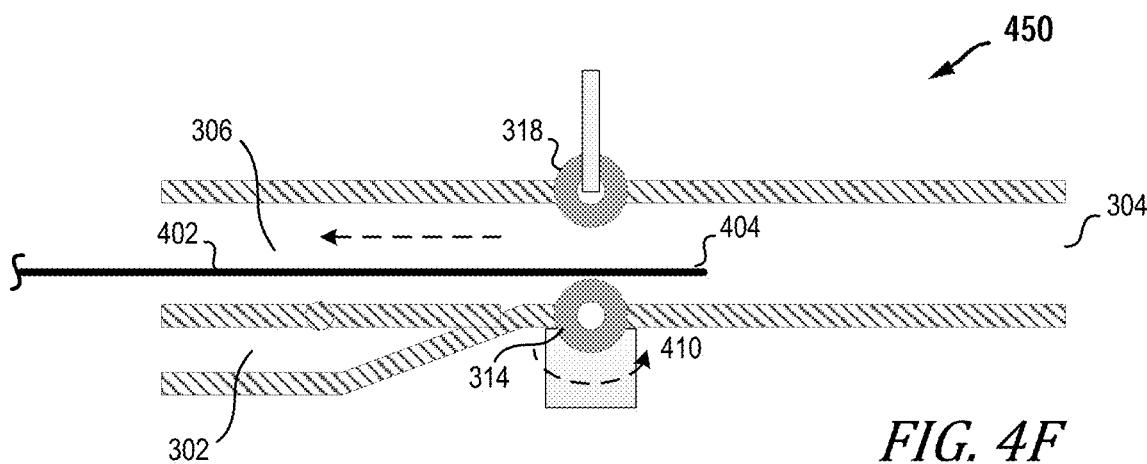

FIGS. 4A-4F are simplified, cross-section views through the retrofit ADF shown in FIG. 3A and are provided herein to illustrate one embodiment of a process flow for automatically transferring a printed election sheet output from a legacy printer to a legacy scanner, which is separate and distinct from the legacy printer, without human intervention. In the process step 400 shown in FIG. 4A, a printed election sheet 402 output from the legacy printer enters the input path 302 of the retrofit ADF and advances through the one-way flapper 308 toward the open end 304 of the retrofit ADF. The printed election sheet 402 has a head end 404 and a tail end 406, as shown in FIG. 4A. When the printed election sheet 402 is output from the legacy printer, the head end 404 of the printed election sheet 402 pushes through the one-way flapper 308, causing the one-way flapper 308 to open the input path 302 and close the output path 306.

In the process step 410 shown in FIG. 4B, a first set of command signals supplied from the external processing device (or internal processing device) cause the pressure roller 318 to drop down toward the bi-directional sheet roller 314 to provide the pressure needed to sandwich the printed election sheet 402 between the pressure roller 318 and the bi-directional sheet roller 314, and further cause the bi-directional sheet roller 314 to rotate in a clockwise direction 408 to advance the printed election sheet 402 away from output port of the legacy printer toward the open end 304 of the retrofit ADF. As shown in FIG. 4B, the open end 304 of the retrofit ADF allows the head end 404 of the printed election sheet 402 to advance freely through the open end 304 without restriction. In some embodiments, the first set of command signals may be supplied from the external processing device (or internal processing device) in response to feedback signals received, for example, by a first paper sensor mounted within the input path 302 and/or a flapper sensor coupled to the one-way flapper 308, as described above.

In the process step 420 shown in FIG. 4C, the roller sub-assembly comprising the bi-directional sheet roller 314 and the pressure roller 318 advances the printed election sheet 402 in the direction of the open end 304 until the tail end 406 of the printed election sheet 402 passes through the one-way flapper 308. The one-way flapper 308 closes once the tail end 406 of the printed election sheet 402 passes through the one-way flapper 308, as shown in FIG. 4C. In some embodiments, a flapper sensor coupled to the one-way flapper 308 may detect when the one-way flapper 308 opens and closes, and may supply a feedback signal to the external processing device (or the internal processing device) once the printed election sheet 402 passes through the one-way flapper 308 and the one-way flapper 308 closes.

In the process step 430 shown in FIG. 4D, a second set of command signals supplied from the host processor (see, e.g., FIG. 1) cause the bi-directional sheet roller 314 to rotate in a counter-clockwise direction 410 to reverse the paper flow direction through the output path 306 and transfer the tail end 406 of the printed election sheet 402 to the input port of the legacy scanner. In some embodiments, the external processing device (or internal processing device) may detect when the tail end 406 of the printed election sheet 402 passes through the one-way flapper 308 (FIG. 4C), and may supply the second set of command signals to the bi-directional sheet roller 314 in response to said detecting. For example, the external processing device (or internal processing device) may supply the second set of command signals to the bi-directional sheet roller 314 in response to the feedback signal sent from the flapper sensor.

Once the tail end 406 of the printed election sheet 402 is provided to the input port of the legacy scanner, the second set of command signals supplied from the external processing device (or internal processing device) cause the pressure roller 318 to lift upwards away from the bi-directional sheet roller 314, as shown in the process step 440 shown in FIG. 4E. In some embodiments, the legacy scanner may provide a feedback signal to the external processing device (or internal processing device) indicating that the tail end 406 of the printed election sheet 402 is in the input port of the legacy scanner, and the external processing device (or internal processing device) may use the feedback signal from the legacy scanner to generate and supply the command signal used to lift the pressure roller 318. Lifting the pressure roller 318 releases the pressure placed on the printed election sheet by the pressure roller 318 and bi-directional sheet roller 314 and enables the printed election sheet 402 to be pulled into the legacy scanner without restriction, as shown in the process flow 450 shown in FIG. 4F. Once the printed election sheet 402 is pulled into the legacy scanner, the legacy scanner generates a scanned image of the printed election sheet 402 automatically or under control of the host processor.

FIGS. 4A-4F illustrate one example process flow for automatically transferring a printed election sheet output from a legacy printer to a legacy scanner, which is separate and distinct from the legacy printer, without human intervention in accordance with the present disclosure. While the process flow shown in FIGS. 4A-4F is shown for simplex printing, a skilled artisan having the benefit of this disclosure would understand how the illustrated process flow may be adapted for duplex printing.

Figure 5:
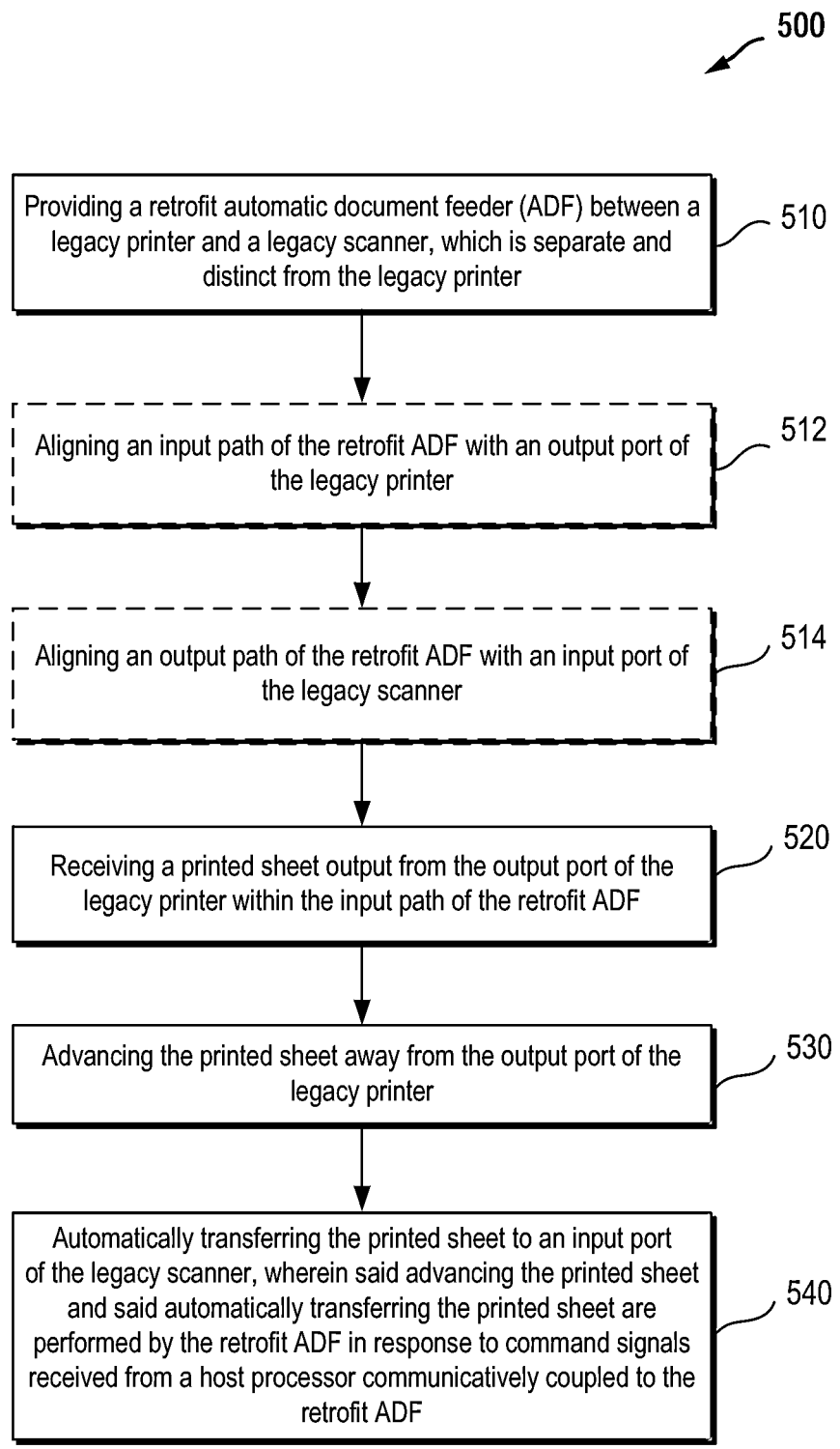
FIG. 5 is a flowchart diagram illustrating one embodiment of a method to automatically transfer a printed election sheet from a legacy printer to a legacy scanner, which is separate and distinct from the legacy printer, without human intervention.

FIG. 5 illustrates one embodiment of a method 500 to automatically transfer a printed election sheet from a legacy printer to a legacy scanner, which is separate and distinct from the legacy printer, without human intervention. The method 500 shown in FIG. 5 may begin, in some embodiments, by providing a retrofit automatic document feeder (ADF) between the legacy printer and the legacy scanner, wherein the legacy scanner is separate and distinct from the legacy printer (in step 510). The method 500 may utilize any of the retrofit ADF embodiments shown in FIGS. 2A-2B, 3A-3B, 4A-4F and described above, or an equivalent thereof comprising one or more of the features described above.

After a retrofit ADF is provided between the legacy printer and the legacy scanner (in step 510), the method 500 may continue, in some embodiments, by receiving a printed election sheet output from an output port of the legacy printer within an input path of the retrofit ADF (in step 520), advancing the printed election sheet away from the output port of the legacy printer (in step 530), and automatically transferring the printed election sheet to an input port of the legacy scanner (in step 540). In the method 500 shown in FIG. 5, the step 530 and the step 540 are performed by the retrofit ADF in response to command signals received from a host processor communicatively coupled to the retrofit ADF. In doing so, the method 500 automatically transfers the printed election sheet from the legacy printer to the legacy scanner without human intervention.

In some embodiments, the method 500 shown in FIG. 5 may adapt the retrofit ADF provided in step 510 to a particular legacy printer and a particular legacy scanner (in optional steps 512 and 514) prior to receiving the printed election sheet in step 520. For example, the method 500 may align the input path of the retrofit ADF with the output port of the legacy printer (in step 512) and may align an output path of the retrofit ADF with the input port of the legacy scanner (in step 514). In some embodiments, the method 500 may align the output path of the retrofit ADF (in step 514) by adjusting one or more of: a length of the output path of the retrofit ADF to accommodate a horizontal distance between the output port of the legacy printer and the input port of the legacy scanner; and an angle of the output path of the retrofit ADF to accommodate a vertical distance between the output port of the legacy printer and the input port of the legacy scanner. Other adjustments may be made to the output path and/or the input path of the retrofit ADF to adapt the retrofit ADF provided in step 510 to a particular legacy printer and a particular legacy scanner (in optional steps 512 and 514).

It will be recognized that the embodiment shown in FIG. 5 is exemplary and additional methods may utilize the techniques described herein. Further, additional steps may be added to the method shown in the FIG. 5 as the steps described are not intended to be exclusive. Moreover, the order of the steps is not limited to the order shown in FIG. 5 as different orders may occur and/or various steps may be performed in combination or at the same time.

Further modifications and alternative embodiments of the inventions described herein will be apparent to those skilled in the art in view of this description. Accordingly, this description is to be construed as illustrative only and is for the purpose of teaching those skilled in the art the manner of carrying out the inventions described and claimed herein. It is to be understood that the forms and methods of the inventions herein shown and described are to be taken as presently preferred embodiments. Equivalent techniques may be substituted for those illustrated and described herein and certain features of the inventions may be utilized independently of the use of other features, all as would be apparent to one skilled in the art after having the benefit of this disclosure.

What is claimed is:

1. An election voting system for processing a printed election sheet of a voter's voting selections in an election, comprising:
a retrofit automatic document feeder (ADF) coupled between a printer and a scanner, the scanner being a separate stand-alone device distinct from the printer, wherein the retrofit ADF is coupled to receive the printed election sheet output from the printer, advance the printed election sheet away from an output port of printer and automatically transfer the printed election sheet to an input port of the scanner, where it is scanned to generate a scanned image of the printed election sheet; and
a processing device configured to control the retrofit ADF.

2. The system of claim 1, wherein the printer comprises an output tray coupled to receive the printed election sheet output from the printer, and wherein the retrofit ADF is provided within the output tray of the printer.

3. The system of claim 1, wherein the retrofit ADF comprises:
an input path arranged at a first end of the retrofit ADF, wherein the input path of the retrofit ADF is aligned with the output port of printer;
an output path arranged at the first end of the retrofit ADF above the input path of the retrofit ADF, wherein the output path of the retrofit ADF is aligned with the input port of the scanner; and
an open end opposing the first end of the retrofit ADF, wherein the open end allows the printed election sheet to advance away from the output port of the printer without restricting a maximum length of the printed election sheet.

4. The system of claim 3, wherein the retrofit ADF further comprises:
a one-way flapper coupled between the input path of the retrofit ADF and the output path of the retrofit ADF;
a bi-directional printed election sheet roller configured to: (a) rotate in a first direction to advance the printed election sheet away from the output port of the printer, and (b) rotate in a second direction to transfer the printed election sheet to the input port of the scanner once the printed election sheet output from the printer advances through and past the one-way flapper; and
a pressure roller configured to provide pressure to sandwich the printed election sheet between the pressure roller and the bi-directional printed election sheet roller while the bi-directional printed election sheet roller advances the printed election sheet away from the output port of the printer and transfers the printed election sheet to the input port of the scanner.

5. The system of claim 4, wherein the one-way flapper:
opens the input path of the retrofit ADF and closes the output path of the retrofit ADF when a head end of the printed election sheet output from the printer pushes through the one-way flapper; and
closes the input path of the retrofit ADF and opens the output path of the retrofit ADF when a tail end of the printed election sheet output from the printer advances through and past the one-way flapper.

6. The system of claim 4, wherein the presser roller is arranged above the bi-directional printed election sheet roller and configured to:
move down toward the bi-directional printed election sheet roller to provide the pressure to sandwich the printed election sheet between the pressure roller and the bi-directional printed election sheet roller; and
move up away from the bi-directional printed election sheet roller to release the pressure once the printed election sheet is transferred to the input port of the scanner.

7. The system of claim 4, wherein the presser roller is arranged below the bi-directional printed election sheet roller and configured to:
move up toward the bi-directional printed election sheet roller to provide the pressure to sandwich the printed election sheet between the pressure roller and the bi-directional printed election sheet roller; and move down away from the bi-directional printed election sheet roller to release the pressure once the printed election sheet is transferred to the input port of the scanner.

8. The system of claim 4, wherein the retrofit ADF further comprises a rotational mechanism coupled to the bi-directional printed election sheet roller, wherein the processing device is coupled to the rotational mechanism and configured to:
supply a first command to the rotational mechanism, which causes the rotational mechanism to rotate the bi-directional printed election sheet roller in the first direction to advance the printed election sheet away from the output port of the printer; and
supply a second command to the rotational mechanism, which causes the rotational mechanism to rotate the bi-directional printed election sheet roller in the second direction to transfer the printed election sheet to the input port of the scanner once the printed election sheet output from the printer advances through and past the one-way flapper.

9. The system of claim 4, wherein the retrofit ADF further comprises a vertical translation mechanism coupled to the pressure roller, wherein the processing device is coupled to the vertical translation mechanism and configured to:
supply a first command to the vertical translation mechanism, which causes the vertical translation mechanism to move the pressure roller toward the bi-directional printed election sheet roller to provide the pressure to sandwich the printed election sheet between the pressure roller and the bi-directional printed election sheet roller; and
supply a second command to the vertical translation mechanism, which causes the vertical translation mechanism to move the pressure roller away from the bi-directional printed election sheet roller to release the pressure once the printed election sheet is transferred to the input port of the scanner.

10. The system of claim 1, wherein the scanner is used to scan the printed election sheet to create an electronic cast vote record.

11. The system of claim 1, further comprising a ballot marking device coupled to the printer, the printed election sheet containing vote selections of a voter requiring accessible voting through use of the ballot marking device, wherein the ADF allows an accessible voting workflow that does not require the assistance of an election official or poll worker to transport a printed election sheet between the printer and the scanner.

12. A retrofit automatic document feeder (ADF) for use in an election voting workflow utilizing a printed election sheet, the ADF coupled between a legacy printer and a legacy scanner, which is separate and distinct from the legacy printer, the retrofit ADF comprising:
an input path arranged at a first end of the retrofit ADF, wherein the input path of the retrofit ADF is aligned with an output port of the legacy printer and coupled to receive a printed election sheet output from the output port of the legacy printer;
an output path arranged at the first end of the retrofit ADF above the input path of the retrofit ADF, wherein the output path of the retrofit ADF is aligned with an input port of the legacy scanner, the legacy scanner being a separate stand-alone device distinct from the legacy printer; and
a roller sub-assembly coupled to the input path of the retrofit ADF and the output path of the retrofit ADF, wherein the roller sub-assembly is configured to advance the printed election sheet away from the output port of the legacy printer and automatically transfer the printed election sheet to the input port of the legacy scanner.

13. The retrofit automatic document feeder of claim 12, further comprising an open end opposing the first end of the retrofit ADF, wherein the open end allows the printed election sheet to advance away from the output port of the legacy printer without restricting a maximum length of the printed election sheet.

14. The retrofit automatic document feeder of claim 13, wherein a minimum length of the printed election sheet is substantially equal to a distance between the output port of the legacy printer and the roller sub-assembly, and wherein the maximum length of the printed election sheet is unlimited.

15. The retrofit automatic document feeder of claim 12, wherein a length of the output path of the retrofit ADF is adjustable to accommodate a horizontal distance between the output port of the legacy printer and the input port of the legacy scanner.

16. The retrofit automatic document feeder of claim 12, wherein an angle of the output path of the retrofit ADF is adjustable to accommodate a vertical distance between the output port of the legacy printer and the input port of the legacy scanner.

17. The retrofit automatic document feeder of claim 12, further comprising a one-way flapper coupled between the input path of the retrofit ADF and the output path of the retrofit ADF.

18. The retrofit automatic document feeder of claim 17, wherein the one-way flapper:
opens the input path of the retrofit ADF and closes the output path of the retrofit ADF when a head end of the printed election sheet output from the legacy printer pushes through the one-way flapper; and
closes the input path of the retrofit ADF and opens the output path of the retrofit ADF when a tail end of the printed election sheet output from the legacy printer advances through and past the one-way flapper.

19. The retrofit automatic document feeder of claim 17, wherein the roller sub-assembly comprises:
a bi-directional sheet roller configured to: (a) rotate in a first direction to advance the printed election sheet away from the output port of the legacy printer, and (b) rotate in a second direction to transfer the printed election sheet to the input port of the legacy scanner once the printed election sheet output from the legacy printer advances through and past the one-way flapper; and
a pressure roller configured to provide pressure to sandwich the printed election sheet between the pressure roller and the bi-directional sheet roller while the bi-directional sheet roller advances the printed election sheet away from the output port of the legacy printer and transfers the printed election sheet to the input port of the legacy scanner.

20. The retrofit automatic document feeder of claim 19, wherein the roller sub-assembly further comprises a rotational mechanism, which is coupled to the bi-directional sheet roller and configured to receive from a processing device:
a first command to rotate the bi-directional sheet roller in the first direction to advance the printed election sheet away from the output port of the legacy printer; and a second command to rotate the bi-directional sheet roller in the second direction to transfer the printed election sheet to the input port of the legacy scanner once the printed election sheet output from the legacy printer advances through and past the one-way flapper.

21. The retrofit automatic document feeder of claim 19, wherein the roller sub-assembly further comprises a vertical translation mechanism, which is coupled to the pressure roller and configured to receive from a processing device:
a first command to move the pressure roller toward the bi-directional sheet roller to provide the pressure to sandwich the printed election sheet between the pressure roller and the bi-directional sheet roller; and
a second command to move the pressure roller away from the bi-directional sheet roller to release the pressure once the printed election sheet is transferred to the input port of the legacy scanner.

22. The retrofit automatic document feeder of claim 12, wherein the printed election sheet is a marked ballot.

23. A method to transfer a printed election sheet of a voter's voting selections in an election from a printer to a scanner without human intervention, the method comprising:
providing a retrofit automatic document feeder (ADF) between the printer and the scanner, wherein the scanner is separate and distinct from the printer;
receiving a printed election sheet output from an output port of the printer within an input path of the retrofit ADF;
advancing the printed election sheet away from the output port of the printer; and
automatically transferring the printed election sheet to an input port of the scanner;
wherein said advancing the printed election sheet and said automatically transferring the printed election sheet are performed by the retrofit ADF in response to command signals received from a processor device controlling the retrofit ADF.

24. The method of claim 23, wherein said providing the retrofit ADF comprises providing the retrofit ADF within an output tray of the printer, wherein the printer is used to generate the printed election sheet of a voter's voting selections in an election, and wherein the scanner is used to scan the printed election sheet to create an electronic cast vote record.

25. The method of claim 24, wherein the method is utilized to provide accessible voting for a voter using a ballot marking device coupled to the printer, the printed election sheet containing vote selections of a voter requiring accessible voting through use of the ballot marking device, wherein the ADF allows an accessible voting workflow that does not require the assistance of an election official or poll worker to transport a printed election sheet between the printer and the scanner.

26. The method of claim 23, wherein after said providing the retrofit ADF and before said receiving the printed election sheet, the method further comprises:
aligning the input path of the retrofit ADF with the output port of the printer; and
aligning an output path of the retrofit ADF with the input port of the scanner.

27. The method of claim 26, wherein said aligning the output path of the retrofit ADF comprises adjusting one or more of:
a length of the output path of the retrofit ADF to accommodate a horizontal distance between the output port of the printer and the input port of the scanner; and
an angle of the output path of the retrofit ADF to accommodate a vertical distance between the output port of the printer and the input port of the scanner.

28. The method of claim 23, wherein the retrofit ADF comprises a roller sub-assembly coupled between the input path of the retrofit ADF and an output path of the retrofit ADF, and wherein said method further comprises:
supplying a first set of command signals from the processing device to the roller sub-assembly to perform said advancing the printed election sheet away from the output port of the printer; and
supplying a second set of command signals from the processing device to the roller sub-assembly to perform said automatically transferring the printed election sheet to the input port of the scanner.

29. The method of claim 28, wherein the roller sub-assembly comprises a bi-directional printed election sheet roller driven by a rotational mechanism and a pressure roller driven by a vertical translation mechanism, and wherein said supplying the first set of command signals comprises:
supplying a first command from the processing device to the rotational mechanism, wherein the first command causes the rotational mechanism to rotate the bi-directional printed election sheet roller in a first direction to advance the printed election sheet away from the output port of the printer; and
supplying a second command from the processing device to the vertical translation mechanism, wherein the second command causes the vertical translation mechanism to move the pressure roller toward the bi-directional printed election sheet roller and sandwich the printed election sheet between the pressure roller and the bi-directional printed election sheet roller while the bi-directional printed election sheet roller advances the printed election sheet away from the output port of the printer.

30. The method of claim 29, wherein the retrofit ADF further comprises a one-way flapper coupled between the input path of the retrofit ADF and the output path of the retrofit ADF, and wherein said method further comprises:
detecting when a tail end of the printed election sheet advances through and past the one-way flapper; and
supplying the second set of command signals from the processing device to the roller sub-assembly in response to said detecting.

31. The method of claim 30, wherein the roller sub-assembly comprises a bi-directional printed election sheet roller driven by a rotational mechanism and a pressure roller driven by a vertical translation mechanism, and wherein said supplying the second set of command signals comprises:
supplying a first command from the processing device to the rotational mechanism, wherein the first command causes the rotational mechanism to rotate the bi-directional printed election sheet roller in a second direction to transfer the printed election sheet to the input port of the scanner once the printed election sheet output from the printer advances through and past the one-way flapper; and
supplying a second command from the processing device to the vertical translation mechanism, wherein the second command causes the vertical translation mechanism to move the pressure roller away from the bi-directional printed election sheet roller and release the printed election sheet from the roller sub-assembly once the printed election sheet is transferred to the input path of the scanner.

32. The method of claim 23, wherein the printed election sheet is a printed marked ballot.

* * * * *